US012037141B1

(12) United States Patent
Guo et al.

(10) Patent No.: US 12,037,141 B1
(45) Date of Patent: Jul. 16, 2024

(54) MAIN FRAME STRUCTURE HAVING BOX-SECTION BEARING BEAMS OF LAUNCH VEHICLE ENGINE

(71) Applicant: Dalian University of Technology, Dalian (CN)

(72) Inventors: Xu Guo, Dalian (CN); Zhi Sun, Dalian (CN); Wenyu Hao, Dalian (CN); Tichang Jiao, Dalian (CN); Shurui Ye, Dalian (CN)

(73) Assignee: Dalian University of Technology, Dalian (CN)

( * ) Notice: Subject to any disclaimer, the term of this patent is extended or adjusted under 35 U.S.C. 154(b) by 0 days.

(21) Appl. No.: 18/544,463

(22) Filed: Dec. 19, 2023

(30) Foreign Application Priority Data

Mar. 16, 2023 (CN) .......................... 202310252948.5

(51) Int. Cl.
*B64G 1/00* (2006.01)
(52) U.S. Cl.
CPC .................... *B64G 1/002* (2013.01)
(58) Field of Classification Search
CPC ..................................................... B64G 1/002
See application file for complete search history.

(56) References Cited

FOREIGN PATENT DOCUMENTS

CN 112727638 A * 4/2021 .............. F02K 9/60
CN 215166620 U * 12/2021

* cited by examiner

*Primary Examiner* — Valentina Xavier
(74) *Attorney, Agent, or Firm* — Porus IP LLC

(57) ABSTRACT

A main frame structure having box-section bearing beams of a launch vehicle engine includes a body. The body includes upper bearing table tops, lower bearing table tops, a cross gasket, a connecting ring and the box-section bearing beams. The box-section bearing beam includes an upper surface, a lower surface and two side beam walls, and has a cavity structure. Penetrating transverse ribs penetrating the two side beam walls are arranged on the box-section bearing beams, and one ends of the box-section bearing beams are circumferentially distributed at an outer side of the connecting ring. The lower bearing table tops are arranged at the outer side of the connecting ring, the lower bearing table tops are connected to the cross gasket, and the other ends of the upper surfaces and the lower surfaces are connected by means of arc chamfers and are connected to the upper bearing table tops.

10 Claims, 3 Drawing Sheets

MAIN FRAME STRUCTURE HAVING BOX-SECTION BEARING BEAMS OF LAUNCH VEHICLE ENGINE

CROSS REFERENCE TO THE RELATED APPLICATIONS

This application is based upon and claims priority to Chinese Patent Application No. 202310252948.5, filed on Mar. 16, 2023, the entire contents of which are incorporated herein by reference.

TECHNICAL FIELD

The present invention relates to the technical field of force transmission structures, and in particular to a main frame structure having box-section bearing beams of a launch vehicle engine.

BACKGROUND

The implementation of China's aerospace engineering is inseparable from a launch vehicle, which as the main vehicle for a spacecraft to enter the space, the carrying capacity of which directly determines the scope of exploration in the cosmic space. The launch capacity is an important parameter index to measure a launch vehicle, which is affected by a structure-mass ratio, engine specific impulse, speed loss, an interstage ratio and other factors. In order to further improve the carrying capacity of China's launch vehicle, researchers have performed a series of topology optimization work on each component of the launch vehicle. A force transmission frame structure serves as a key component of the connection between an engine of a launch vehicle and a vehicle body, the stiffness of the force transmission frame structure plays a decisive role in whether a thrust load of an engine can be effectively transmitted to a vehicle body, and the weight directly affects a thrust-weight ratio of the engine of the launch vehicle, that is, the larger the thrust-weight ratio of the engine, the stronger the launch capacity of the launch vehicle. Therefore, the force transmission frame structure occupies an extremely important position in the lightweight design of the whole vehicle structure. Therefore, it is urgent to update the structure of the force transmission frame to maximize the thrust-weight ratio under the premise of ensuring the structural safety.

SUMMARY

An objective of the present invention is to provide a main frame structure having box-section bearing beams of a launch vehicle engine, which improves bending resistance of a main frame and minimizing the mass of the structure.

In order to achieve the above objective, the present invention provides a main frame structure having box-section bearing beams of a launch vehicle engine. The main frame structure includes a body, where the body includes upper bearing table tops, lower bearing table tops, a cross gasket, a connecting ring and the box-section bearing beams. The box-section bearing beam includes an upper surface, a lower surface and two side beam walls, and upper end surfaces and lower end surfaces of the two side beam walls are connected to the upper surface and the lower surface respectively to form a cavity structure. Penetrating transverse ribs penetrating the two beam walls are arranged on the box-section bearing beams, and one ends of the four box-section bearing beams are circumferentially distributed at an outer side of the connecting ring. The four lower bearing table tops are circumferentially distributed at the outer side of the connecting ring, and the four lower bearing table tops are connected to the cross gasket. The other ends of the upper surfaces and the lower surfaces are connected by means of arc chamfers and are connected to the upper bearing table tops, and the upper bearing table tops are connected to a truss structure.

Preferably, an included angle between the upper surface of the box-section bearing beam and a horizontal plane is 0-5°, and the lower surface of the box-section bearing beam is arc-shaped.

Preferably, one end of the penetrating transverse rib is connected to the upper surface by means of an arc chamfer, the other end of the penetrating transverse rib is connected to the lower surface by means of an arc chamfer, and an inclination angle of the penetrating transverse rib is 30-60°.

Preferably, a distance between the outermost edges of the symmetrically arranged upper bearing table tops is 1-3 meters.

Preferably, a thickness of the penetrating transverse rib is 2-3 times that of the side beam wall, and the thickness of the side beam wall is greater than or equal to 10 mm.

Preferably, the side beam wall has the equal thickness in the direction from the connecting ring to the upper bearing table top.

Preferably, the thickness of the side beam wall gradually increases or decreases in the direction from the connecting ring to the upper bearing table top.

Preferably, the thickness of the side beam wall gradually increases and then gradually decreases in the direction from the connecting ring to the upper bearing table top.

Preferably, the body is made of high-strength steel which is alloy steel with the yield strength of being above 750 MPa and is machined by using a casting or welding or additive manufacturing technology.

Preferably, the body is made of aluminum alloy or titanium alloy which is machined by using a casting or welding or additive manufacturing technology.

Therefore, by employing the main frame structure having box-section bearing beams of a launch vehicle engine, which has the above structure, the present invention has the following beneficial effects:

(1) The box-section bearing beam is employed, such that extremely strong bending resistance is achieved; and the penetrating transverse ribs are arranged to further improve stiffness and strength, the mass of the structure is minimized, and the manufacturing cost is greatly saved on the premise of satisfying the safety.

(2) The body has a size of 1-3 meters, and modification can be made according to an actual size and a load form to satisfy specified mechanical properties, such that applicability is very wide in terms of the model size.

The technical solutions of the present invention will be further described in detail in combination with the accompanying drawings and the examples.

Figure 1:
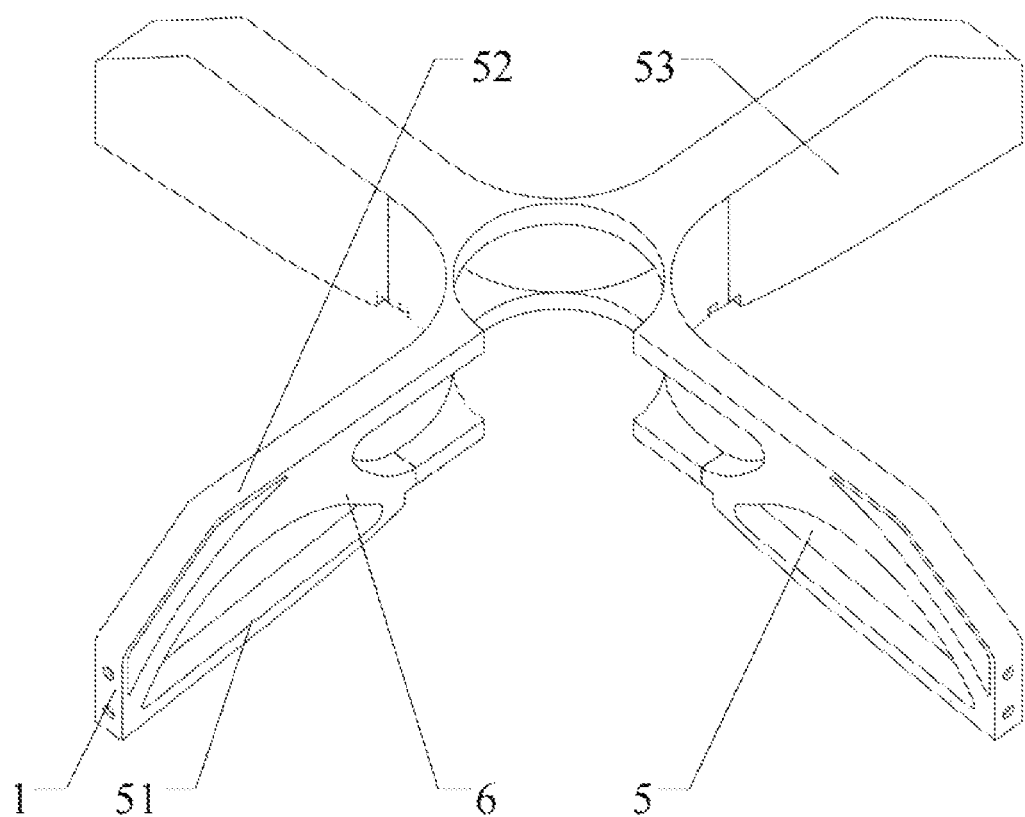
FIG. 1 is a schematic structural diagram of a main frame structure having box-section bearing beams of a launch vehicle engine of the present invention.
Figure 2:
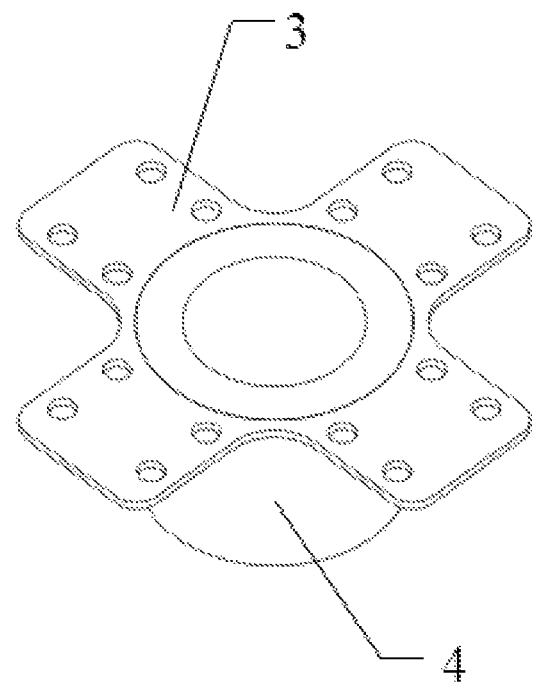
FIG. 2 is a schematic structural diagram of a cross gasket and a connecting ring of the present invention.
Figure 3:
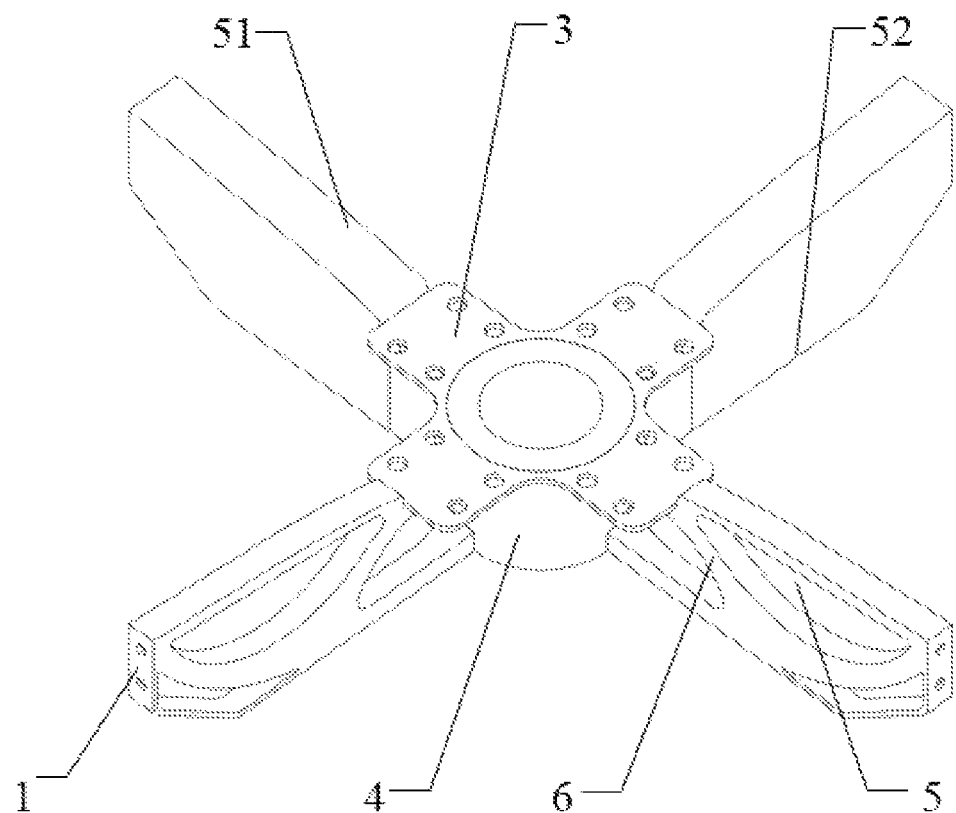
FIG. 3 is a schematic structural diagram of a cross gasket at a mounting position of the present invention.
Figure 4:
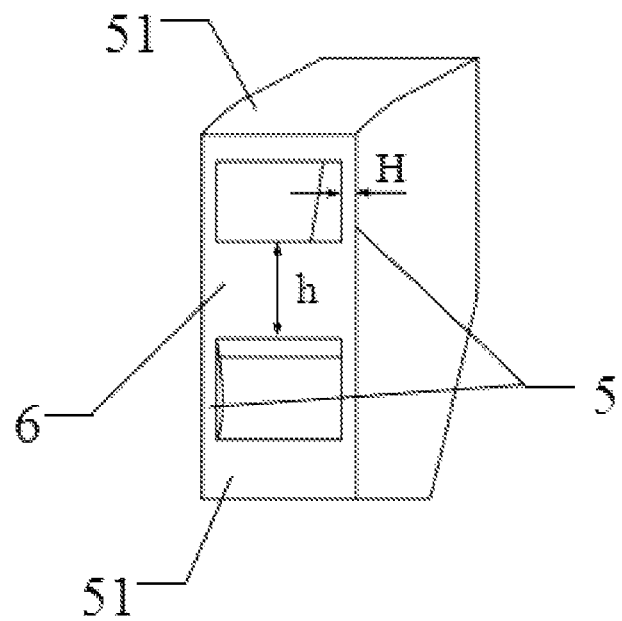
FIG. 4 is a schematic structural diagram of the present invention without a cross gasket.
Figure 5:
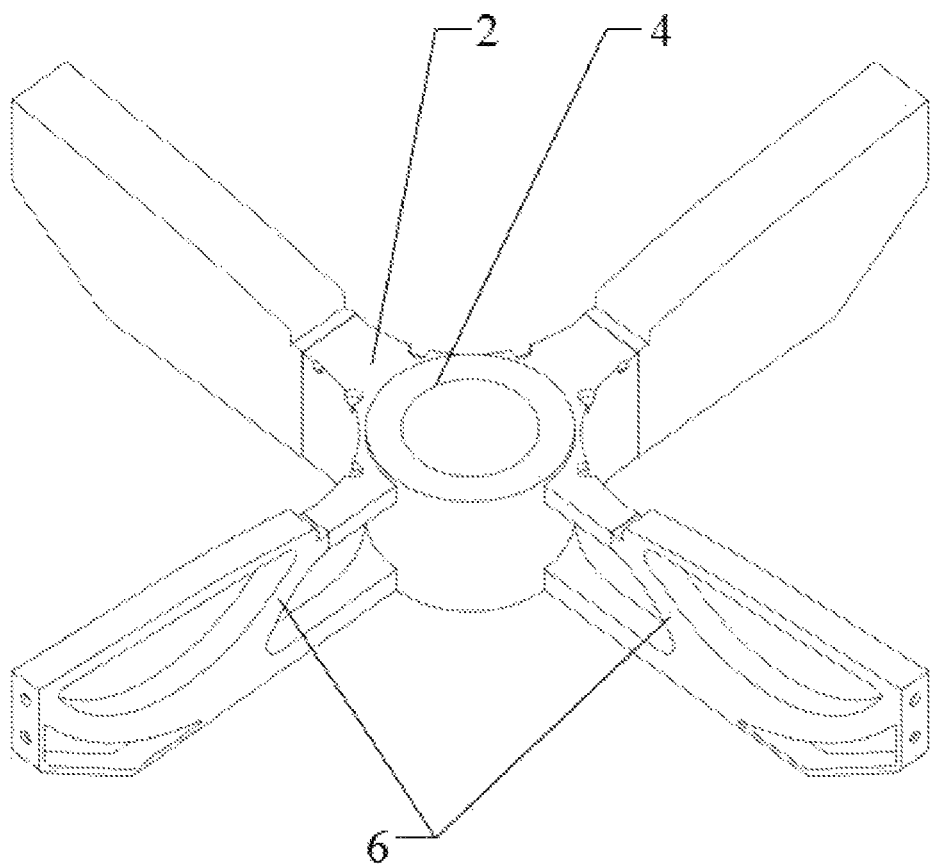
FIG. 5 is a schematic structural diagram of a section of a box-section bearing beam of the present invention.

REFERENCE NUMERALS IN FIGURES 1, upper bearing table top; 2, lower bearing table top; 3, cross gasket; 4, connecting ring; 5, box-section bearing beam; 51, upper surface; 52, lower surface; 53, side beam wall; and 6, penetrating transverse rib.

DETAILED DESCRIPTION OF THE EMBODIMENTS

Example

In order to make the objectives, technical solutions and advantages of the examples of the present invention more clear, the technical solutions in the examples of the present invention will be clearly and completely described below in conjunction with the accompanying drawings in the examples of the present invention. Obviously, the described examples are some examples rather than all examples of the present invention. Generally, components of the examples of the present invention described and shown in the accompanying drawings may be arranged and designed in various manners.

Therefore, the following detailed description of the examples of the present invention provided in the accompanying drawings is not intended to limit the scope of the present invention for which protection is claimed, but is merely representative of selected examples of the present invention. Based on the examples of the present invention, other various examples obtained by those of ordinary skill in the art without making creative efforts fall within the scope of protection of the present invention.

It should be noted that like numerals and letters denote like items in the following accompanying drawings, therefore, once an item is defined in one accompanying drawing, it need not be further defined and explained in the subsequent accompanying drawings.

In the above description of the present invention, it is to be noted that the orientation or positional relationship indicated by terms "up", "down", "inner", "outer", etc. is based on the orientation or positional relationship shown in the accompanying drawings, or the orientation or positional relationship of a product conventionally placed during use, merely for ease of description and simplification of the description of the present invention, and not to indicate or imply that the referenced device or element must have a particular orientation and be constructed and operative in a particular orientation, and thus may not be construed as a limitation on the present invention.

In the description of the present invention, it should be further noted that, unless otherwise explicitly specified and defined, the terms "arrangement", "mounting" and "connection" should be understood in a broad sense, for example, they may be a fixed connection, a detachable connection, or an integrated connection; may be a mechanical connection, or an electrical connection; and may be a direct connection, or an indirect connection via an intermediate medium, or communication inside two elements. For those of ordinary skill in the art, the specific meanings of the above terms in the present invention may be understood according to specific circumstances.

The embodiments of the present invention are described in detail below in conjunction with the accompanying drawings.

As shown in FIGS. 1-5, a main frame structure having box-section bearing beams of a launch vehicle engine includes a body, where the body includes upper bearing table tops 1, lower bearing table tops 2, a cross gasket 3, a connecting ring 4 and the box-section bearing beams 5. The box-section bearing beam 5 includes an upper surface 51, a lower surface 52 and two side beam walls 53, and upper end surfaces and lower end surfaces of the two side beam walls 53 are connected to the upper surface 51 and the lower surface 52 respectively to form a cavity structure. Penetrating transverse ribs 6 penetrating the two side beam walls 53 are arranged on the box-section bearing beams 5 to further improve strength of beam bodies.

One ends of the four box-section bearing beams 5 are circumferentially distributed at an outer side of the connecting ring 4, the four lower bearing table tops 2 are circumferentially distributed at the outer side of the connecting ring 4, and the four lower bearing table tops 2 are connected to the cross gasket 3. A through hole is provided in a middle of the cross gasket 3, and a diameter of the through hole is the same as an inner diameter of the connecting ring 4. An included angle between the upper surface of the box-section bearing beam and a horizontal plane is 5°, the lower surface 52 of the box-section bearing beam 5 is arc-shaped, and the other ends of the upper surface 51 and the lower surface 52 are connected by means of arc chamfers and connected to the upper bearing table top 1. One end of the penetrating transverse rib 6 is connected to the upper surface 51 by means of an arc chamfer, and the other end of the penetrating transverse rib 6 is connected to the lower surface 52 by means of an arc chamfer. An inclination angle of the penetrating transverse rib 6 in this example is 45°. A thickness of the penetrating transverse rib 6 is 2-3 times that of the side beam wall 53, and the thickness of the side beam wall 53 is greater than or equal to 10 mm. The arc chamfers are arranged at the joints, such that stress concentration is reduced. The upper bearing table top 1 is provided with threaded holes and is connected to a truss structure.

Specific sizes of this example are as follows:

In this example, a thickness of the side beam wall 53 decreases gradually and then increases gradually in the direction from the connecting ring 4 to the upper bearing table top 1, and a thickness of the penetrating transverse rib 6 varies with the thickness of the side beam wall 53. A distance between the outermost edges of the symmetrically arranged upper bearing table tops 1 is 1400 mm, and the overall maximum height is 230 mm. The upper surface 51 and the lower surface 52 have a thickness of 15 mm, the penetrating transverse rib 6 has the minimum thickness (h) of 20 mm, and the box-section bearing beam 5 has the minimum thickness (H) of 10 mm. The overall structure is made of 30CrMnSiA material, a material density is 7.8 g/mm$^3$, and the total mass of the structure is about 385 kg. By means of numerical simulation, structure analysis is performed by applying zero load on the upper surface 51, and the maximum stress of the overall structure is less than the maximum buckling modulus of 1080 MPa of the material, the maximum axial displacement is 14.7 mm, and the maximum lateral displacement is 3.65 mm, all of which satisfy stiffness and strength requirements of a general main frame. Therefore, the main frame structure of this example can well ensure stability under general working conditions.

Example 2

This example is different from Example 1 as follows: the thickness of the side beam wall 53 gradually increases or decreases in the direction from the connecting ring 4 to the upper bearing table top 1, and the thickness of the penetrating transverse rib 6 also varies accordingly.

Example 3

This example is different from Example 1 as follows: the side beam wall 53 has the equal thickness in the direction from the connecting ring 4 to the upper bearing table top 1.

Numerical simulation is performed on both Example 2 and Example 3, both of which satisfy stiffness and strength requirements of a general main frame.

For the box-section bearing beam 5, this section cavity structure saves more solid materials, ensures that the mass of the main frame is minimized, and has strong torque resistance. Numerical simulation shows that swing by 15° is achieved in a null state. Under a working condition load, the structure passes the stiffness and strength check, and shows relatively strong bending resistance. The structural form is relatively simple.

Finally, it should be noted that the above examples are merely used for describing the technical solutions of the present invention, rather than limiting the same. Although the present invention has been described in detail with reference to the preferred examples, those of ordinary skill in the art should understand that the technical solutions of the present invention may still be modified or equivalently replaced. However, these modifications or substitutions should not make the modified technical solutions deviate from the spirit and scope of the technical solutions of the present invention.

What is claimed is:

1. A main frame structure having box-section bearing beams of a launch vehicle engine, comprising a body, wherein the body comprises upper bearing table tops, lower bearing table tops, a cross gasket, a connecting ring and the box-section bearing beams, wherein the box-section bearing beam comprises an upper surface, a lower surface and two side beam walls, upper end surfaces and lower end surfaces of the two side beam walls are connected to the upper surface and the lower surface respectively to form a cavity structure, penetrating transverse ribs penetrating the two side beam walls are arranged on the box-section bearing beams, one ends of the four box-section bearing beams are circumferentially distributed at an outer side of the connecting ring, the four lower bearing table tops are circumferentially distributed at the outer side of the connecting ring, the four lower bearing table tops are connected to the cross gasket, the other ends of the upper surfaces and the lower surfaces are connected by means of arc chamfers and are connected to the upper bearing table tops, and the upper bearing table tops are connected to a truss structure.

2. The main frame structure having the box-section bearing beams of the launch vehicle engine according to claim 1, wherein an included angle between the upper surface of the box-section bearing beam and a horizontal plane is 0-5°, and the lower surface of the box-section bearing beam is arc-shaped.

3. The main frame structure having the box-section bearing beams of the launch vehicle engine according to claim 2, wherein one end of the penetrating transverse rib is connected to the upper surface by means of an arc chamfer, the other end of the penetrating transverse rib is connected to the lower surface by means of an arc chamfer, and an inclination angle of the penetrating transverse rib is 30-60°.

4. The main frame structure having the box-section bearing beams of the launch vehicle engine according to claim 3, wherein a distance between the outermost edges of the symmetrically arranged upper bearing table tops is 1-3 meters.

5. The main frame structure having the box-section bearing beams of the launch vehicle engine according to claim 4, wherein a thickness of the penetrating transverse rib is 2-3 times that of the side beam wall, and the thickness of the side beam wall is greater than or equal to 10 mm.

6. The main frame structure having the box-section bearing beams of the launch vehicle engine according to claim 5, wherein the side beam wall has the equal thickness in a direction from the connecting ring to the upper bearing table top.

7. The main frame structure having the box-section bearing beams of the launch vehicle engine according to claim 5, wherein the thickness of the side beam wall gradually increases or decreases in a direction from the connecting ring to the upper bearing table top.

8. The main frame structure having the box-section bearing beams of the launch vehicle engine according to claim 5, wherein the thickness of the side beam wall gradually increases and then gradually decreases in a direction from the connecting ring to the upper bearing table top.

9. The main frame structure having the box-section bearing beams of the launch vehicle engine according to claim 1, wherein the body is made of high-strength steel which is alloy steel with a yield strength of being above 750 MPa and is machined by using a casting or welding or additive manufacturing technology.

10. The main frame structure having the box-section bearing beams of the launch vehicle engine according to claim 1, wherein the body is made of aluminum alloy or titanium alloy which is machined by using a casting or welding or additive manufacturing technology.

\* \* \* \* \*